Nov. 19, 1957     B. J. BOUWMAN ET AL     2,813,374
FIXTURE FOR ALIGNING ANNULAR PARTS
Filed March 4, 1953     4 Sheets-Sheet 1
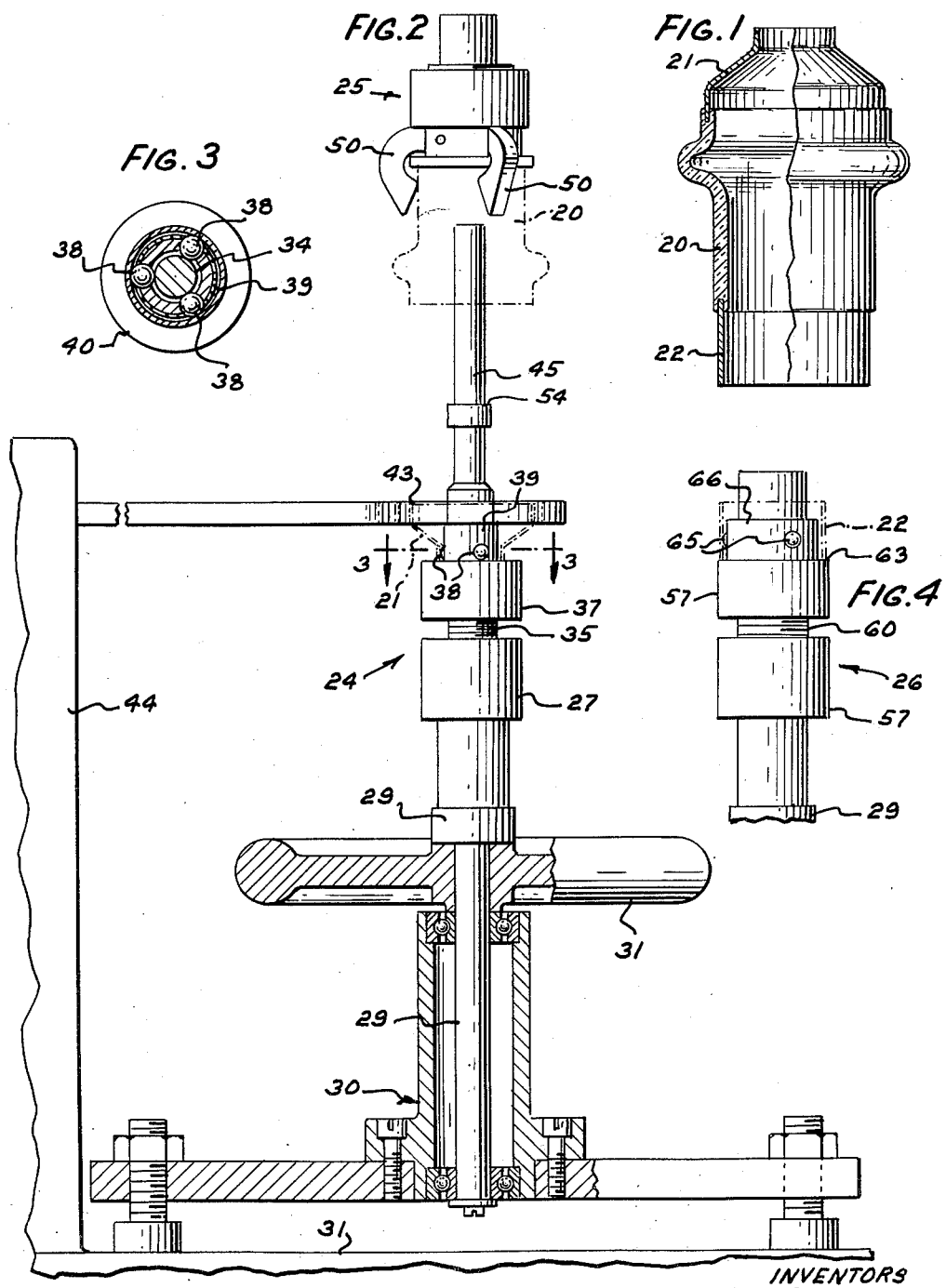
INVENTORS
B. J. BOUWMAN
J. S. GELLATLY
BY    ATTORNEY Nov. 19, 1957 — B. J. BOUWMAN ET AL — 2,813,374
FIXTURE FOR ALIGNING ANNULAR PARTS
Filed March 4, 1953 — 4 Sheets-Sheet 2

INVENTORS
B. J. BOUWMAN
J. S. GELLATLY
BY
ATTORNEY

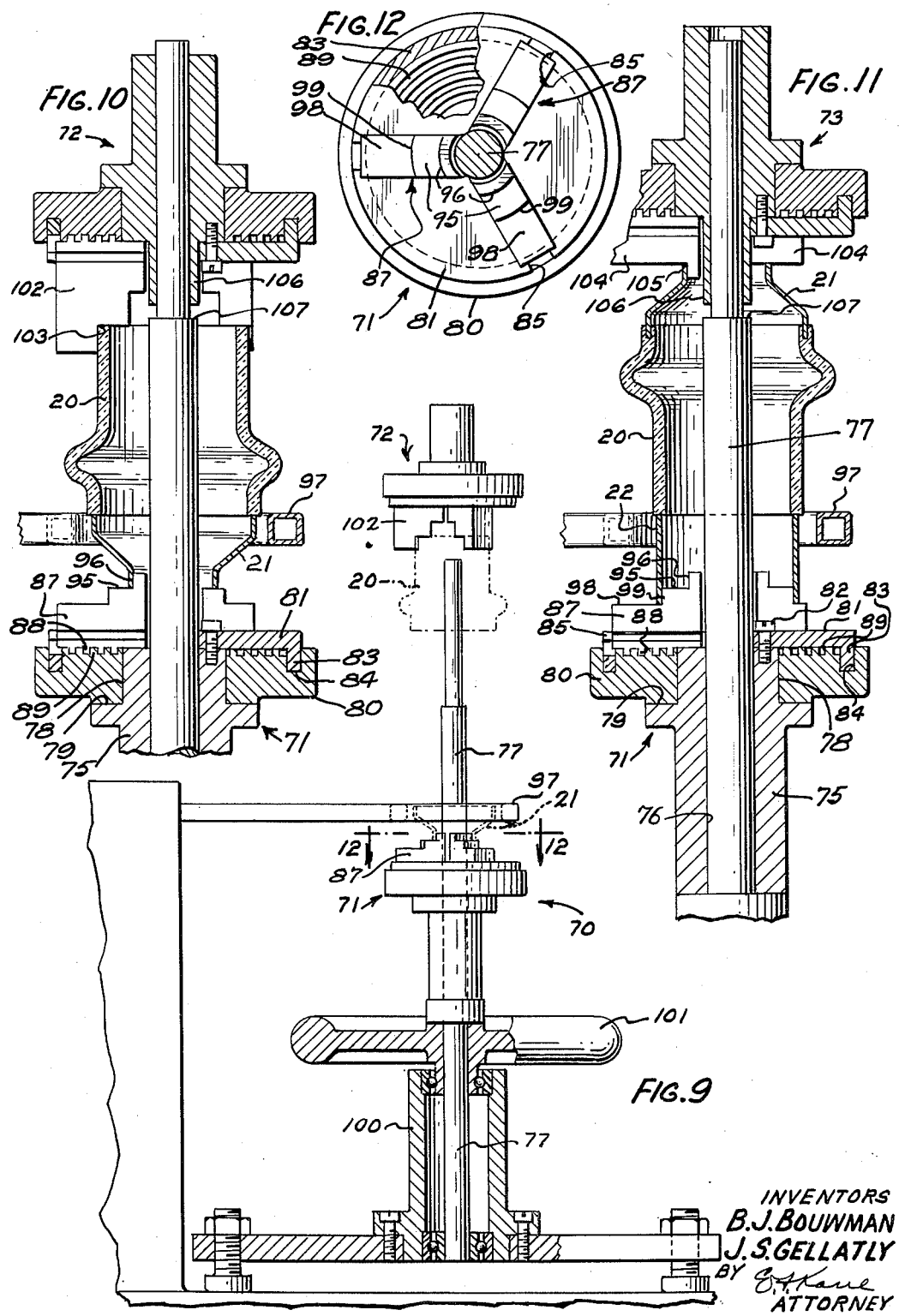

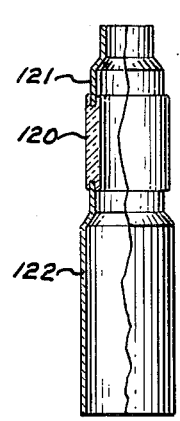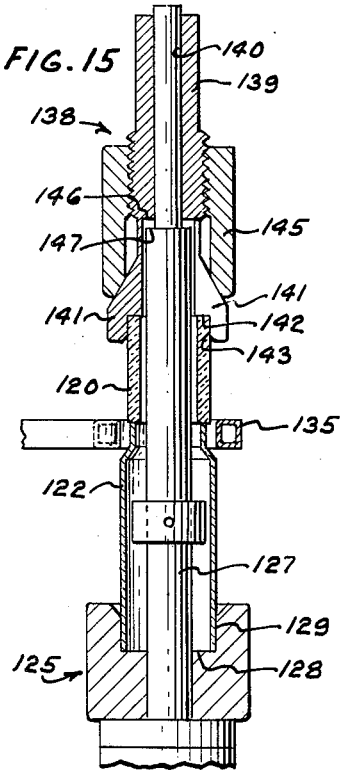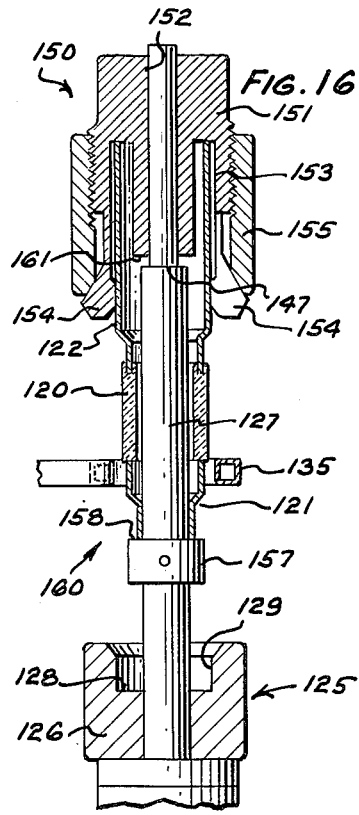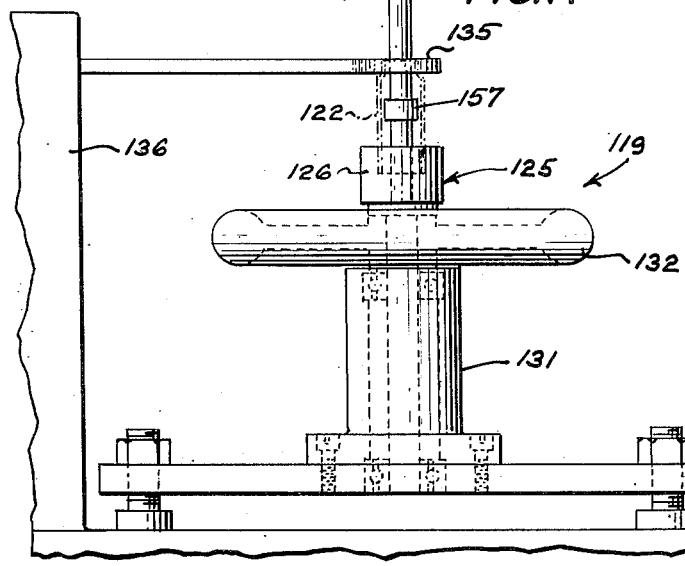

United States Patent Office 2,813,374
Patented Nov. 19, 1957

2,813,374

FIXTURE FOR ALIGNING ANNULAR PARTS

Bert J. Bouwman, Berwyn, Ill., and John S. Gellatly, Westfield, N. J., assignors to Western Electric Company, Incorporated, New York, N. Y., a corporation of New York Application March 4, 1953, Serial No. 340,348

10 Claims. (Cl. 49—1)

This invention relates to aligning fixtures and more particularly to a fixture for supporting a plurality of annular glass parts and metal parts in engagement and coaxial alignment with each other while the parts are being sealed one to another.

It is an object of the present invention to provide an improved fixture for supporting annular parts in engagement and coaxial alignment with each other.

It is a further object of the invention to provide a fixture for supporting annular metal parts and glass parts in engagement and coaxial relation to each other while they are being bonded to each other and to permit a limited movement between the parts.

The invention contemplates the provision of a first holder having a guide rod extending axially therefrom and having means engageable with a first annular part for holding the part in a predetermined position concentric with the rod, a second holder having a bore therethrough for receiving the rod and having means engageable with a second annular part for holding the second part in coaxial relation to the second holder, whereby the second holder may be telescoped over the rod to bring the first and the second parts into engagement and coaxial alignment with each other, and means for supporting one of the holders with the axis thereof disposed in a substantially vertical position.

As another feature of the invention, means are provided for limiting the axial movement of the holders relative to each other while one of the parts is being fused and moved into bonded engagement with the other part.

As a further feature of the invention means are provided for removably supporting the holders, whereby either holder may be supported on the base to hold one part and the other holder with the other part therein may be telescoped thereon to bring the parts into coaxial alignment and engagement with each other.

Other objects and advantages of the invention will become apparent by reference to the following detailed description and the accompanying drawings illustrating several embodiments of the invention, in which Fig. 1 is an elevational sectional view of an assembly of annular metal and glass parts bonded together;

Fig. 2 is an elevational sectional view of the fixture for aligning the parts shown in connection with an induction heating device for heating the annular parts to effect the bonding thereof and showing parts of the fixture in separated relation to each other;

Fig. 3 is a horizontal cross-sectional view taken on the line 3—3 of Fig. 2;

Fig. 4 is an elevational view of one of the holders for one of said parts;

Fig. 9 is a side elevational sectional view of another embodiment of the invention showing parts thereof in separated relation to each other;

Figs. 10 and 11 are enlarged vertical sectional views of the fixture showing the parts thereof in various positions for aligning various annular parts of the assembly;

Fig. 12 is a plan sectional view of the fixture taken on the line 12—12 of Fig. 9;

Fig. 13 is an elevational view of another bonded assembly of annular metal and glass parts;

Fig. 14 is an elevational view of another embodiment of the invention for supporting the annular parts shown in Fig. 13 in aligned relation one to the other during the bonding of the parts together; and Figs. 15 and 16 are vertical sectional views of a portion of the fixture showing the parts thereof in different positions.

Figure 5:
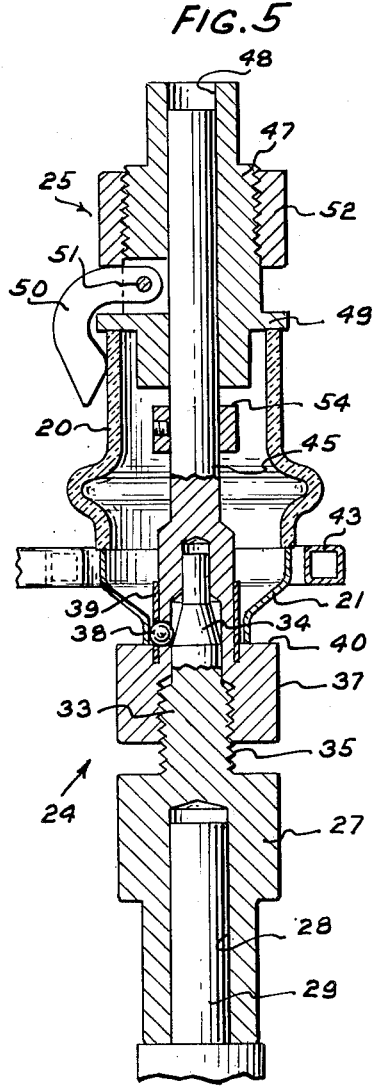
Figs. 5 and 6 are enlarged fragmentary vertical sectional views through the aligning fixture showing parts of the fixture in changed position for aligning different ones of the parts of the assembly.

The fixtures herein disclosed are designed to support an annular part or sleeve 20 of glass in engagement and coaxial alignment with an annular part or sleeve 21 of metal while the end of the glass sleeve is fused and sealed to the sleeve 21 and to support the partial assembly of the sleeves 20 and 21 in coaxial alignment with an annular part or sleeve 22 of metal and with the other end of the glass sleeve 20 in engagement therewith while the end of the glass sleeve is heated to fuse and bond it to the metal sleeve 22. The parts 21 and 22 are made from metal having a coefficient of expansion substantially equal to that of the glass in the part 20 and the sleeves, when bonded together, form an envelope assembly for use in electrical apparatus.

The embodiment of the fixture disclosed in Figs. 1–8 comprises a first holder or chuck 24 for holding the metal sleeve 21, a second holder or chuck 25 for holding the glass sleeve 20, and a holder or chuck 26 for holding the metal sleeve 22. The chuck 24 comprises a cylindrical member 27 having a cylindrical recess or socket 28 for receiving a shouldered post or spindle 29 which is rotatably supported in a base 30 and has a hand wheel 31 thereon for imparting rotation to the post 29 and the parts supported thereon. The base 30 rests on a horizontal supporting surface 31, such as a bench or table top, and may have adjustable feet thereon for aligning the post 29 in a substantially vertical position.

The member 27 of the chuck 24 has an upwardly extending shank 33 provided with a conical portion 34 and a threaded portion 35 which extends into a recess in a cylindrical member 37 and into engagement with the internally threaded portion thereof. The member 37 is provided with a series of three radially disposed guide apertures in which jaws or gripping members in the form of balls 38 are disposed for movement radially outwardly into engagement with the inner periphery of one end of the sleeve 21 to centralize and grip the sleeve in coaxial alignment with the axis of the chuck 24. An apertured retaining ring 39 fixed to the member 37 serves to retain the balls 38 on the chuck 24. The metal sleeve 21 is adapted to seat on a shoulder 40 formed on the member 37 prior to its being gripped by the chuck to support the sleeve at a predetermined elevation with the upper edge of the sleeve 21 disposed within and substantially level with an induction heating coil 43 of a high frequency current generating device 44 (Fig. 2). The cylindrical member 37 of the chuck 24 has an elongated portion extending upwardly therefrom to form a guide rod 45 for telescopingly receiving the chuck 25 thereon for axial movement.

The chuck 25 comprises a cylindrical member 47 having a bore 48 therethrough for receiving the rod 45 and provided with a shoulder 49 having a flat transverse surface against which the glass sleeve 20 is adapted to be held by three gripping jaws 50. The jaws 50 are pivotally connected by pins 51 to the member 47 and are movable into gripping relation with the glass element 20 by an actuating sleeve 52 threadedly mounted on the member 47. With the chuck 24 supported on the post 29 as shown in Fig. 5 and with a metal sleeve 21 gripped therein and with a glass element 20 gripped in the chuck 25, the chuck 25 and glass element 20 are telescoped over the guide rod 45 to bring the glass sleeve 20 into coaxial alignment and engagement with the upper end of the metal sleeve 21 as shown in Fig. 5. The metal sleeve 21 supports the sleeve 20 and the chuck 25 thereon with the lower end of the chuck 25 a predetermined distance above a stop shoulder 54 formed by a collar fixed to the rod 45.

The induction heating coil 43 may be energized to effect the heating of the upper portion of the metal sleeve 21, the heat from which is transmtited to the lower end portion of the glass sleeve 20 and causes it to fuse. The weight of the glass sleeve and the chuck 25 attached thereto causes the glass sleeve to move downwardly until the chuck engages the shoulder 54 and causes the fused glass to flow around the upper edge of the metal element 21 and bond the parts together to form a sealed joint therebetween. After the sleeves 20 and 21 have been bonded together and have cooled, the glass sleeve is released from the chuck 25 and the chuck 24 with the bonded assembly of the sleeves 20 and 21 thereon is removed from the post 29, and the chuck 26 is seated on the post preparatory to the operation of bonding the metal sleeve 22 to the other end of the glass element 20.

The chuck 26 comprises cylindrical members 56 and 57, the former having a recess 58 for slidably receiving the post 29 therein to support the chuck 26. The cylindrical member 56 has an upwardly extending shank 59 provided with screw threads 60 and a conical surface 61 and a central bore 62 adapted to slidably receive the guide rod 45 therein. The member 57 of the chuck 26 is centrally apertured for receiving the shank 59 and the rod 45 therein and has an internally threaded portion engageable with the screw threads 60 on the shank 59. A shoulder 63 is formed on the member 57 for supporting a metal sleeve 22 thereon. A series of three radially disposed apertures are formed in the member 57 for receiving a plurality of balls 65 which are adapted to be moved by the conical surface 61 into engagement with the inner periphery of the metal sleeve 22 to grip the sleeve in coaxial relation to the chuck 26 and the post 29. An apertured retaining ring 66 is fixed to the member 57 for retaining the balls 50 thereon.

Figure 6:
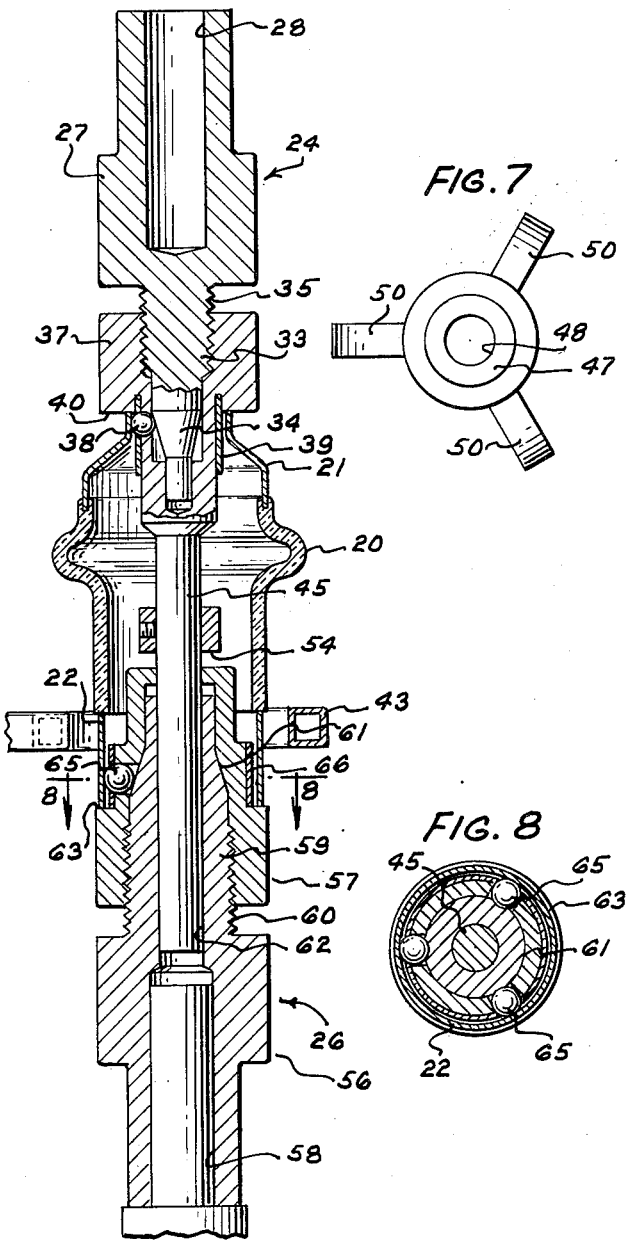
Figure 7:
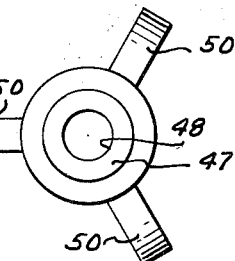
Fig. 7 is a top view of one of the holders of the fixture.
Figure 8:
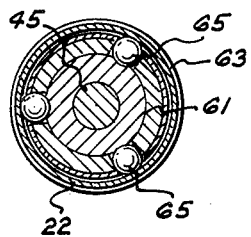
Fig. 8 is a sectional view through the fixture taken on the line 8—8 of Fig. 6.

After the glass sleeve 20 has been bonded to the metal element 21, the chuck 25 is released from the glass element, as previously stated, and the chuck 24 with the assembled sleeves 20 and 21 supported thereon is removed from the post 29, after which the chuck 26 is applied to the post 29 for the next operation of bonding the glass sleeve 20 to the metal sleeve 22. The sleeve 22 is applied to the seat 63 of the chuck 26 and the actuating ring 57 is rotated to cause the sleeve 22 to be gripped by the chuck 26 in coaxial alignment with the axis thereof. The chuck 24 with the sleeves 20 and 21 thereon is then inverted and the guide rod 45 of the chuck 24 is inserted in the bore 62 of the member 56 into telescoping engagement with the chuck 26 and moved downwardly to bring the lower end of the glass sleeve 20 into engagement with the upper edge of the metal sleeve 22 as shown in Fig. 6. In this position the sleeve 22 supports the glass sleeve 20 and the chuck 24 against downward movement and in a position with the shoulder 54 on the rod 45 in a predetermined spaced relation to the upper end of the chuck 26. With the parts thus arranged, the induction heating coil 43 may be energized to effect the heating of the upper end of the metal sleeve 22 and cause the lower end of the glass sleeve 20 to fuse and flow around the upper edge of the sleeve 22 and be bonded thereto to form a sealed juncture between the sleeves. The downward movement of the glass sleeve 20 and the chuck 24 is limited by the engagement of the shoulder 54 on the rod 45 with the upper end of the chuck 26 and this movement, which is the same as that traversed by the chuck 25 during the former sealing operation, insures a uniform length of seal between the ends of the glass sleeve 20 and the sleeves 21 and 22. On completion of the sealing and bonding operation, the sealed joint is permitted to cool, after which the chuck 24 may be manipulated to release the sleeve 21 therefrom and the chuck 24 removed from the fixture, after which the chuck 26 may be manipulated to release the sleeve 22 and permit the assembly of the sleeves 20, 21, and 22 to be removed from the chuck 26. The chuck 26 may then be removed from the post 29 and the chuck 24 re-applied thereto in preparation for the next sealing operation.

In the embodiment illustrated in Figs. 9–12 the fixture 70 comprises three holders or chucks 71, 72, and 73 for holding the several sleeves during the assembling and sealing of the sleeves one to another.

The chuck 71 comprises a cylindrical body member 75 provided with a central bore 76 for receiving a cylindrical guide rod 77 therethrough and on which the chuck 71 is mounted. At the upper portion thereof the body member 75 is provided with an upwardly extending cylindrical portion 78 of reduced diameter and a shoulder 79 for rotatably receiving an annular disc-like actuating member 80 which is retained on the member 75 against upward displacement by an annular apertured disc 81 secured to the end of the member 75 by a plurality of screws 82. The disc 81 has a downwardly directed annular marginal flange 83 disposed in an annular groove 84 in the actuating member 80 and the disc 81 is provided with three slots 85 extending from the central aperture to the outer periphery thereof and disposed equiangularly about the axis of the disc.

Three jaw members 87 are mounted in the slots 85 and have curved teeth 88 formed on the lower surface thereof which engage in spiral grooves 89 formed in the upper face of the actuating member 80 whereby in response to turning movement of the member 80 the jaws 87 are moved radially. The jaws 87 of the holder 71 are provided with a first pair of transversely disposed flat and arcuate surfaces 95 and 96 forming a seat adapted to engage the end portion of the metal sleeve 21 (Fig. 10) and support the sleeve in coaxial alignment with the rod and with the upper end thereof in a predetermined position within and substantially level with an induction heating coil 97 of a high frequency current generating device (Fig. 9). A second pair of cooperating flat and arcuate surfaces 98 and 99 on the jaws 87 form seats adapted to receive one end of the metal sleeve 22 (Fig. 11) for supporting the sleeve 22 in coaxial alignment with the rod 77 and with the upper end of the element 22 in a predetermined position within the heating coil 97 and substantially level therewith.

The guide rod 77 on which the holder 71 is mounted is supported in a base member 100 for rotation about a vertical axis and has a hand wheel 101 secured thereto by means of which the guide rod and the holder 71 may be rotated. The base member 100 is supported on a suitable supporting surface such as a table top or bench and may be provided with means for leveling it to vertically align the rod 77.

The holder or chucks 72 and 73 are of similar construction to that of the chuck 71 with the exception that the jaws 102 of the chuck 72 are provided with pairs of flat surfaces and arcuate surfaces forming seats 103 adapted to receive the ends of the glass sleeve 20 for holding it in coaxial alignment with the axis of the chuck 72. The chuck 73 is provided with jaws 104 having pairs of flat surfaces and arcuate surfaces forming seats 105 adapted to engage the end of the metal sleeve 21 for supporting the sleeve 21 and the sleeve 20 bonded thereto in coaxial alignment with the axis of the chuck 73. In addition each of the chucks 72 and 73 is provided with a sleeve 106 formed as an extension of the body member of the chuck and with the end of the sleeve 106 adapted to engage a shoulder 107 formed on the guide rod 77. As shown herein the upper portion of the guide rod 77 is reduced in diameter to form the shoulder 107 and the bore of the body members of the chucks 72 and 73 are of a corresponding diameter for telescopingly engaging the reduced end of the guide rod.

This embodiment of the aligning fixture is used in a manner somewhat similar to the first embodiment for aligning and supporting the elements 20, 21, and 22 in engagement one with another while the parts are bonded together. In the operation, the tubular part 21 is telescoped over the guide rod 77 into engagement with the surfaces 95 of the jaws 87 of the chuck 71, the member 80 is then actuated to cause the sleeve 21 to be gripped by the jaws 87 and coaxially aligned with the rod 77. The glass sleeve 20 is then seated in and gripped by the chuck 72, which is then telescoped over the rod 77 and lowered to rest the sleeve 20 on the sleeve 21 in coaxial alignment with each other. The induction heating coil 97 is then energized to effect the heating of the upper portion of the sleeve 21 and the lower edge of the glass sleeve 20 which fuses and seals itself into bonded engagement with the sleeve 21 as the weight of the chuck 72 causes the glass sleeve 20 to move downwardly until the end of the sleeve 106 engages the shoulder 107.

After the sleeve 20 and 21 have cooled the chuck 71 may be actuated to release the sleeve 21 therefrom and the chuck 72 with the connected sleeves 20 and 21 held therein may then be removed from the guide rod 77 after which the connected sleeves 20 and 21 are released from the chuck 72 and applied to and gripped in the chuck 73 in coaxial relation thereto. A sleeve 22 is then applied to the jaws 87 of the chuck 71 and gripped against the surfaces 98 and 99 thereof in coaxial alignment with the rod 77 and then the chuck 73 with the bonded elements 20 and 21 thereon is telescoped over the rod 77 to bring the end of the glass sleeve 20 into engagement with the metal sleeve 22. The induction heating coil 97 is then energized to cause the upper portion of the sleeve 22 to become heated and cause the heating and fusing of the lower end of the glass sleeve 20 and the movement downwardly thereof into sealing engagement with the sleeve 22. The weight of the chuck 73 urges the glass sleeve 20 downwardly and the downward movement of the glass tube is limited by the engagement of the end of the sleeve 106 of the chuck with the shoulder 107 on the guide rod 77. After the sleeves have cooled, the sleeve 22 may be released from the chuck 71 and the chuck 73 with the assembled and sealed elements 21, 20, and 22 thereon may be removed from the rod 77 and then actuated to release the assembled sleeves therefrom.

In the embodiment of the invention illustrated in Figs. 13-16 the fixture 119 is adapted to support a glass sleeve 120 in abutting and aligned relation successively to each of a pair of annular metal sleeves 121 and 122 to permit the bonding of the sleeve 120, 121, and 122 one to another. The fixture 119 has a holder 125 for the sleeve 122, the holder 125 comprising a cylindrical member 126 having a central aperture for receiving a rod or spindle 127 therethrough and on which the holder 125 is secured. The member 126 is centrally counterbored, providing a shoulder 128 and a cylindrical surface 129 concentric with the axis of the rod 127 and forming a seat in the holder for receiving one end portion of the metal sleeve 122 to support said sleeve in a predetermined position on the fixture and in coaxial relation to the rod 127 (Fig. 15). The rod 127 is rotatably supported in a suitable base 131 and has a hand wheel 132 thereon by means of which the holder 125 and the rod 127 may be rotated. An induction heating coil 135 of a high frequency current generating device 136 is mounted in concentric relation to the rod 127 at an elevation substantially level with the upper end of the sleeve 122 and has an inner diameter sufficiently large to permit the passage of a sleeve 122 therethrough.

A holder 139 in the form of a chuck, which is adapted to receive and hold the glass sleeve 120, comprises a cylindrical body member having a central bore 140 therethrough for receiving the reduced upper end of the rod 127 therein. At one end thereof the member 139 is provided with a plurality of spring mounted jaws 141 which have flat and arcuate surfaces 142 and 143, respectively, forming seats adapted to receive one end of the glass sleeve 120 therein for gripping and holding the sleeve in concentric relation to the bore 140 of the member 139. The jaws 141 are actuated by an actuating sleeve 145 which is threadedly mounted on the member 139.

With the glass sleeve 120 gripped in the chuck 138 the chuck may be telescoped over the rod 127 to position the sleeve 120 in engagement and coaxial alignment with the sleeve 122 (Fig. 15). The induction heating coil 135 is then energized to cause the heating of the upper portion of the metal sleeve 122, the heat from which fuses the lower end of the glass sleeve 120 and causes it to move downwardly around the upper end of the sleeve 122 and become bonded thereto. The downward movement of the sleeve 120 and the chuck 138 is arrested by the engagement of a shoulder 146 formed on the body member 139 of the chuck with the shoulder 147 formed on the rod 127.

After the sleeves 120 and 122 have been bonded together and cooled, the chuck 138 may be disengaged from the glass sleeve 120 and removed from the fixture and the sleeves 120 and 122 may be removed from the holder 125 and the end of the sleeve 122 may be applied to and gripped by a holder or chuck 150 (Fig. 16) preparatory to the heating and bonding together of the sleeves 120 and 121. The chuck 150 comprises a cylindrical body member 151 having a bore 152 for receiving the upper end of the rod 127 and having an annular recess 153 for receiving the sleeve 122 therein. A plurality of spring supported jaws 154 are formed on one end of the body member 151 and are adapted to be moved into engagement with the periphery of the sleeve 122 for gripping and holding the sleeve 122 in coaxial alignment with the bore of the member 151. The spring jaws 154 are actuated by an actuating sleeve 155 threadedly mounted on the member 151 and rotatable relative thereto.

The rod 127 has a diameter slightly less than the inner diameter of the reduced portion of the sleeve 121 and is adapted to receive the sleeve thereon and to position the sleeve in coaxial relation to the axis of the rod. A collar 157 forms a shoulder 158 on the rod 127 for engaging the end of the sleeve 121 and positioning the sleeve vertically on the rod with the upper end of the sleeve substantially level with the high frequency heating coil 135.

With the sleeve 121 in position on the fixture and with the joined sleeves 120 and 122 in the holder 150, the holder 150 may be telescoped over the end of the rod 127 to bring the end of the glass sleeve 120 in engagement and coaxial alignment with the sleeve 121 (Fig. 16). The induction heating coil 135 may then be energized to effect the heating of the upper end of the sleeve 121 to cause the fusing of the lower end of the sleeve 120 and the movement downwardly of the sleeve 120 to form a sealed juncture between the sleeves 120 and 121. The downward movement of the sleeve 120 and the holder 150 is limited to a predetermined distance by the engagement of a portion 161 of the holder 150 with the shoulder 147 on the rod 127. The holder 150 with the assembled and bonded sleeves 120, 121, and 122 may be removed from the fixture and after the parts have been cooled the chuck 150 may be actuated to release the assembly of sleeves 120, 121, and 122 therefrom.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A fixture for aligning and supporting annular parts comprising a first holder having a guide rod extending therefrom and having means engageable with a first annular part for holding said part coaxial with said rod, a second holder having a bore therethrough for receiving the rod and having means engageable with a second annular part for holding the second part in coaxial relation to said bore whereby the second holder may be telescoped over the rod to bring the first and the second parts into engagement and coaxial alignment with each other, and means for removably supporting either of said holders with the axis thereof disposed in a substantially vertical position.

2. A fixture for aligning annular parts comprising a first chuck having a rod extending therefrom and having movable gripping members engageable with a first annular part to support said part in coaxial relation to said rod, a second chuck slidable on said rod and having movable gripping members engageable with a second annular part for holding said part in predetermined relation to said second holder and in coaxial relation to said rod and to the annular part in the first chuck, and means for supporting one of said chucks in a position for receiving and supporting the other chuck for vertical movement.

3. An aligning fixture comprising a base, a rod, means mounting said rod for rotation on said base about a vertical axis, a first holder on said rod having means thereon for seating and holding a tubular first part in coaxial alignment with said axis, and a second holder slidably and removably mounted on said rod above said first holder and having means thereon for seating and gripping a tubular second part in coaxial relation to said first part whereby said second part is coaxially aligned and urged into engagement with the first part by said second holder.

4. A part aligning fixture comprising a base, a rod, means mounting said rod for rotation on said base about a substantially vertical axis and against axial movement, a first chuck on said rod for supporting an annular part in coaxial alignment with said axis, a second chuck slidably and removably mounted on said rod for seating and clamping a tubular glass part in coaxial relation to said first part whereby said second part is coaxially aligned and guided into engagement with the first part and whereby the lower end of said tubular glass part may be heated to fuse it and seal the parts together, and means for limiting the downward movement of said second chuck on said rod.

5. A fixture for aligning and supporting annular parts in engagement with each other while one part is being fused and bonded to the other comprising a first holder having a rod extending therefrom and having means engageable with a first annular part to support said first part in coaxial relation to said rod, a second holder slidable on said rod and having means engageable with a second annular part for holding said second part in a predetermined relation to the second holder and in coaxial relation to said rod and the annular part in the first holder, means for supporting one of said holders with the axis thereof in a substantially vertical position whereby the first and the second holders may be axially aligned and one moved relative to the other to effect a telescoping engagement of the second holder and the rod of said first holder for guiding the upper one of the holders for free axial movement relative to the other to guide one of said parts into engagement with the other of said parts, and means on said rod engageable with the second holder for limiting the extent of movement of the upper holder while said one part is being fused and bonded to the other part.

6. A fixture for aligning and supporting an annular metal part and an annular glass part while said parts are heated and bonded together comprising a base, a rod, means mounting said rod for rotation on said base about a vertical axis, a first chuck on said rod having surfaces engageable with an annular metal part for supporting said part in coaxial alignment with said axis and with one end of the part within an induction heating coil, a second apertured chuck slidably and removably mounted on said rod above said first chuck and having means thereon engageable with a glass part for seating and clamping said glass part in coaxial relation to said metal part and for urging said glass part downwardly into engagement with the metal part, whereby the lower end of said tubular glass part may be fused and moved downwardly around the upper end of the metal part, and means for limiting the downward movement of said second chuck on said rod.

7. A fixture for assembling parts comprising a first holder having means for holding a first annular part concentric with a given axis and having a guide rod concentric with said axis, means for supporting said first holder for rotation about said axis and with the axis disposed vertically, a second holder having a bore for slidably receiving the guide rod and having means for holding a tubular fusible part thereon in concentric relation to said bore, said second holder being slidable on said guide rod for positioning said fusible part in engagement with said first part and in coaxial alignment therewith and for urging said fusible part downwardly against said first part whereby said parts may be heated to cause one end of said fusible part to fuse and be moved downwardly by the second holder and bonded to said other part, and means on said rod to limit the movement of one of said holders relative to the other.

8. In a fixture for aligning and supporting annular parts, a first holder having a guide rod extending therefrom parallel to a predetermined axis through the holder, means on said first holder engageable with a first annular part for holding said part concentric with said axis, an apertured second holder telescopingly engageable with the rod on the first holder and having an axis coaxial with the said axis of the first holder, means on the second holder for holding a second annular part in concentric relation to the axis thereof, and means for supporting one of the holders with the axis thereof in upright position and with the other holder removably supported on said one holder and with the rod of the first holder and the apertured second holder in freely slidable telescoping engagement with each other and with the annular parts in coaxial alignment and engagement with each other.

9. A fixture for aligning annular parts and rotatably supporting them while they are being bonded together comprising a base, a member mounted on said base for rotation about a vertical axis through said member, a pair of holders capable of being individually removably mounted on said member for rotation therewith, and means on each of said holders for holding an annular part in coaxial alignment with said vertical axis and in a predetermined heating zone transversely of said axis when said holders are on said member, one of said holders having a guide rod extending therefrom along said axis, and the other of said holders having a guide aperture for slidably receiving said rod and being positioned and freely slidable thereon to coaxially align the annular parts on the holders and guide them into engagement with each other.

10. A fixture for aligning annular parts and rotatably supporting them in a heating zone while they are being bonded one to another comprising mounting means rotatable about a substantially vertical axis in a predetermined relation to a heating zone, a first holder removably supportable on the mounting means for rotation therewith about said axis and having a guide rod extending therefrom along said axis, means on said first holder for holding a first annular part coaxial with said rod and in the heating zone when said holder is supported on the mounting means, a second holder having a guide aperture therethrough for receiving the guide rod for free sliding movement thereon, means on said second holder for holding a second annular part coaxial with the guide aperture therein whereby the second holder may be telescoped over the rod to bring the first and the second parts into coaxial alignment and engagement with each other in the heating zone to permit them to be bonded together to form a composite annular part, a third holder removably supportable on the mounting means for rotation therewith and having a guide aperture therethrough for receiving the guide rod for free sliding movement thereon, and means on said third holder engageable with a third annular part for holding it coaxial with the guide aperture therein and in the heating zone when said holder is supported on the mounting means, whereby the third holder may be mounted on the supporting means and the rod of the first holder inserted in the guide aperture of the third holder to support the first holder with the composite annular part thereon in coaxial alignment and engagement with the third annular part.

References Cited in the file of this patent

UNITED STATES PATENTS

| | | |
|---|---|---|
| 2,044,818 | Spase | June 23, 1936 |
| 2,306,054 | Guyer | Dec. 22, 1942 |
| 2,399,536 | Baum | Apr. 30, 1946 |
| 2,422,324 | Watrous | June 17, 1947 |
| 2,477,332 | Garbe | July 26, 1949 |
| 2,494,870 | Greiner | Jan. 17, 1950 |
| 2,527,150 | Quinlan | Oct. 24, 1950 |
| 2,553,749 | Clark et al. | May 22, 1951 |